US 6,666,303 B2

(12) United States Patent
Torii et al.

(10) Patent No.: US 6,666,303 B2
(45) Date of Patent: Dec. 23, 2003

(54) WHEEL BEARING ASSEMBLY

(75) Inventors: Akira Torii, Shizuoka (JP); Shigeaki Fukushima, Shizuoka (JP); Eiji Tajima, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/897,459

(22) Filed: Jul. 3, 2001

(65) Prior Publication Data

US 2002/0003071 A1 Jan. 10, 2002

(30) Foreign Application Priority Data

Jul. 4, 2000 (JP) .......................... 2000-202335
Aug. 2, 2000 (JP) .......................... 2000-234764

(51) Int. Cl.$^7$ .......................... F16D 65/12; F16C 19/18; B60B 27/00
(52) U.S. Cl. .................. 188/18 A; 188/218 A; 188/218 XL; 188/73.35; 301/6.1; 301/6.8; 301/105.1; 384/544
(58) Field of Search ............... 188/218 XL, 18 A, 188/218 A, 73.37, 250 E, 206, 205, 18 R, 73.35, 73.36, 73.2, 264 G; 384/544–547; 403/336–337, 224; 301/105.1, 6.8, 6.1, 6.91; 192/30 V, 70.16, 207, 210

(56) References Cited

U.S. PATENT DOCUMENTS

| 2,317,311 A | * | 4/1943 | Stough |
| 2,407,749 A | * | 9/1946 | Sinclair |
| 2,424,106 A | * | 7/1947 | Martens |
| 2,625,438 A | * | 1/1953 | Horn |
| 3,630,323 A | * | 12/1971 | Hickle ............... 188/18 R |
| 4,456,308 A | * | 6/1984 | Opel et al. |
| 4,475,634 A | * | 10/1984 | Flaim et al. ........... 188/218 A |
| 4,681,201 A | * | 7/1987 | Teramae et al. |
| 4,917,440 A | * | 4/1990 | Daudi |
| 5,108,156 A | * | 4/1992 | Bell ................... 301/6.8 |
| 5,255,761 A | * | 10/1993 | Zaremsky |
| 5,269,496 A | * | 12/1993 | Schneider |
| 5,435,420 A | * | 7/1995 | White |
| 5,486,053 A | * | 1/1996 | Beagley et al. |
| 5,651,588 A | * | 7/1997 | Kato |
| 5,908,091 A | * | 6/1999 | Berwanger |
| 5,918,707 A | * | 7/1999 | Saunders, III ........... 188/18 A |
| 5,964,022 A | * | 10/1999 | Mann et al. ............ 188/218 XL |
| 6,098,764 A | * | 8/2000 | Wirth et al. |
| 6,116,386 A | * | 9/2000 | Martin |
| 6,250,814 B1 | * | 6/2001 | Tajima et al. ............ 384/544 |
| 6,309,110 B1 | * | 10/2001 | Tajima et al. ............ 188/18 A |
| 6,357,925 B2 | * | 3/2002 | Tajima et al. ............ 384/546 |
| 6,364,426 B1 | * | 4/2002 | Horne et al. ............ 301/105.1 |
| 6,575,637 B1 | * | 6/2003 | Tajima et al. ............ 384/546 |

FOREIGN PATENT DOCUMENTS

| JP | 2001-80308 | | 3/2001 |
| JP | 2001-105807 | | 4/2001 |
| JP | 2001-180210 | * | 7/2001 |
| JP | 2001-180211 | * | 7/2001 |
| JP | 2001-180212 | * | 7/2001 |
| JP | 2001-191715 | * | 7/2001 |
| JP | 2001-233011 | * | 8/2001 |
| JP | 2001-311442 | * | 11/2001 |

* cited by examiner

Primary Examiner—Douglas C. Butler
(74) Attorney, Agent, or Firm—Wenderoth, Lind & Ponack, L.L.P.

(57) ABSTRACT

A wheel bearing assembly is provided which can suppress brake judder. A film is disposed between the brake rotor-mounting surface of the wheel mounting flange and an abutment surface of a brake rotor to fill a gap therebetween to suppress the deformation of the brake rotor. Also, by concentrating the contact force between the wheel-mounting flange and the brake rotor when a disc wheel of the wheel is tightened to the hub bolts to a portion near the hub bolts, the contact between the wheel-mounting flange and the brake rotor on the surfaces between the hub bolts is suppressed so that undulation of the flat surfaces between the hub bolts will not cause deformation of the brake rotor.

12 Claims, 14 Drawing Sheets

Before assembly

After assembly

FIG. 14A
(PRIOR ART)
FIG. 14B
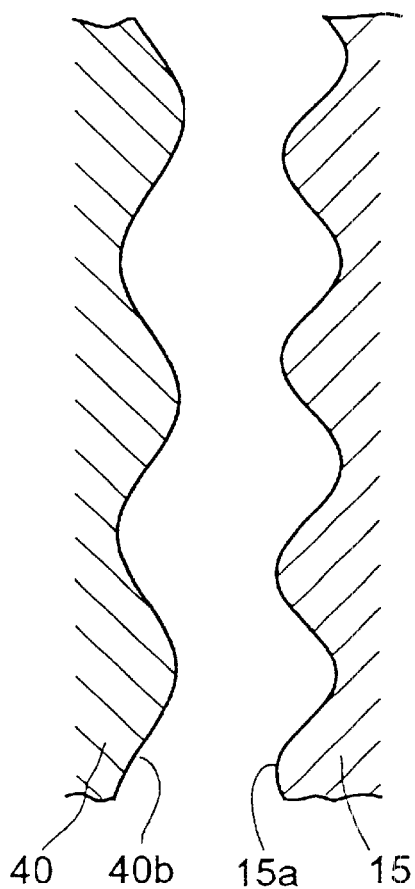
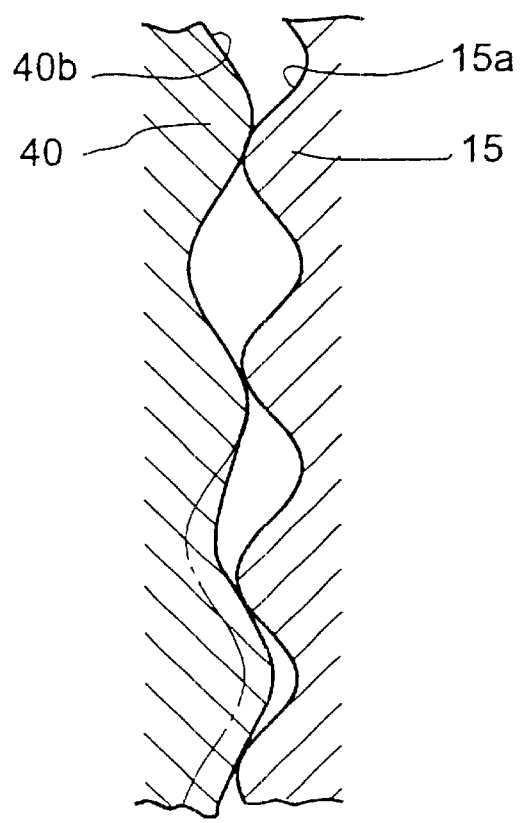

WHEEL BEARING ASSEMBLY

BACKGROUND OF THE INVENTION

This invention relates to a wheel bearing assembly for supporting a vehicle wheel.

Among vehicle wheel bearing assemblies, there are ones for supporting driving wheels and ones for supporting non-driving wheels. Among both types of wheel bearing assemblies, there are many types.

FIG. 13 shows one example thereof. This wheel bearing assembly is for a driving wheel, and comprises an outer member 1, an inner member 11 and double-row rolling elements 31 mounted between the outer member 1 and the inner member 11.

On the inner periphery of the outer member 1, two raceways 3 are formed while on the outer periphery thereof, a flange 2 for mounting to the vehicle body is provided.

The inner member 11 has a hub ring 12 and a raceway member 13. A wheel-mounting flange 15 is provided on the outer periphery of the hub ring 12 at one end thereof. At the other end, a small-diameter portion 12b is formed on which is fitted the raceway member 13.

On the outer peripheries of the hub ring 12 and the raceway member 13, raceways 16 and 20 are formed, respectively. Between the raceways 16, 20 and the raceways 3 of the outer member 1, the rolling elements 31 are mounted.

In order to impart a pre-load to the rolling elements 31, a spline shaft 14c provided on an outer joint member 14 of a constant-velocity joint is mounted into a spline hole 17 formed in the hub ring 12, and a nut 21 is tightened on a threaded shaft 14d provided at the tip of the spline shaft 14c.

The wheel bearing assembly is delivered from a wheel bearing manufacturer to an automobile assembling factory of an automotive manufacturer. At the factory, a separately delivered brake rotor 40 is fixed to one side 15a of the wheel-mounting flange 15 of the wheel bearing assembly by tightening bolts 42.

After assembling, if there is a considerable run-out of the braking surfaces 40a of the brake rotor 40, the frictional force will not be constant, so that vibrations and abnormal noise, so-called brake judder are produced during braking.

In order to suppress vibrations and abnormal noise produced due to run-out of the braking surfaces 40a of the brake rotor 40, heretofore, increasing the machining accuracy of parts has been sought. But such a solution is time-consuming and results in higher cost.

Also, since machining errors of parts accumulate in assembling them, even if the machining accuracy of individual parts is increased, it is difficult to suppress run-out of the braking surfaces 40a of the brake rotor 40.

Further, on the brake rotor-mounting surface 15a of the wheel-mounting flange 15 and the surface 40b of the brake rotor 40 that abuts the brake rotor-mounting surface 15a, as shown in an enlarged view of FIG. 14A, there exist undulations. Thus, a combination of such undulations will largely influence the run-out of the brake rotor 40. Heretofore, at an automobile assembling factory, when the wheel-mounting flange 15 of the wheel bearing assembly and the brake rotor 40, which are delivered as separate parts, are assembled, various adjustments including phase-adjustment at positions where run-out of the wheel-mounting flange 15 and run-out of the braking surfaces 40a of the brake rotor 40 are maximum and minimum have been carried out. Such a method is troublesome and poor in workability.

Also, when the brake rotor-mounting surface 15a of the wheel-mounting flange 15 and the surface 40b of the brake rotor 40 are brought into abutment with each other, due to the above said undulations, an air gap is formed therebetween. When the wheel-mounting flange 15 and the brake rotor 40 are pressed against each other in mounting the wheel, as shown by single-dot chain line in an enlarged view of FIG. 14B, the brake rotor 40 is liable to deform due to the air gap.

Such a deformation of the brake rotor 40 increases run out of the brake rotor 40, thus causing brake judder.

An object of this invention is to suppress deformation of the brake rotor, thereby preventing brake judder in a simple and inexpensive manner.

SUMMARY OF THE INVENTION

According to this invention, there is provided a wheel bearing assembly comprising an outer member having two raceways on its inner periphery, an inner member having raceways on its outer periphery so as to be opposite to the raceways on the outer member, and rolling elements mounted between the raceways. One of the outer member and the inner member is formed with a wheel-mounting flange, the wheel-mounting flange having an outer face serving as a brake rotor-mounting surface. A film is disposed between the brake rotor-mounting surface of the wheel-mounting flange and an abutment surface of a brake rotor that abuts the brake rotor-mounting surface (see an enlarged view shown in FIG. 4A). In FIGS. 4A and 4B, A indicates the film.

If a film is disposed between the brake rotor-mounting surface of the wheel-mounting flange and the abutment surface of the brake rotor, since it fills the air gaps which can be a factor in deformation of the brake rotor when a wheel is mounted, deformation of the brake rotor is suppressed.

While the film is formed of a material softer than steel, too soft of a material such as rubber is not preferable because it will impair the rigidity of the brake rotor and the wheel. The film may be formed by bonding or applying a sheet of an age-hardening resin or a coating of which the major component is an age-hardening resin to the brake rotor-mounting surface of the wheel-mounting flange or the abutment surface of the brake rotor that abuts the wheel-mounting flange.

The film that fills the air gaps, which can be a factor in deformation of the brake rotor, preferably has a thickness of 5 to 200 $\mu$m.

The film may be provided on one or both of the brake rotor-mounting surface of the wheel-mounting flange and the abutment surface of the brake rotor that abuts the wheel-mounting flange.

By using an age-hardening resin sheet or a coating of which the major component is an age-hardening resin as the material for the film, the mounting rigidity of the brake rotor after mounting the wheel can be assured.

Also, by using a thermosetting resin as the material for the film and providing a simple heating step on the assembly line, the mounting rigidity of the brake rotor after mounting the wheel can be assured.

According to this invention, there is also provided a wheel bearing assembly comprising an outer member having two raceways on its inner periphery, an inner member having raceways on its outer periphery so as to be opposite to the raceways on the outer member, and rolling elements mounted between the raceways, one of the outer member and the inner member being formed with a wheel-mounting flange, the wheel-mounting flange having an outer face serving as a brake rotor-mounting surface, characterized in that a plurality of hub bolts are embedded in the wheel-mounting flange and that the contact force between the wheel-mounting flange and the brake rotor when a wheel is tightened to the hub bolts is concentrated at portions near the hub bolts.

As a means for concentrating the contact force between the wheel-mounting flange and the brake rotor at portions near the hub bolts, a chamfer at an edge of each of the holes for the hub bolts formed in the brake rotor may be set to 0.5 mm or under or recesses may be formed between the hub bolts in bolt pitch circle areas on one side of the wheel-mounting flange.

By concentrating the contact force between the wheel-mounting flange and the brake rotor when a wheel is tightened to the hub bolts at portions near the hub bolts, even if there are undulating components on the brake rotor-mounting surface of the wheel-mounting flange and the surface of the brake rotor that abuts the brake rotor-mounting surface, the undulating components will not become a factor in deformation of the brake rotor. Thus it is possible to suppress deformation of the brake rotor and also the run-out of the brake rotor.

Further, in order to suppress deformation of the brake rotor, the following means may be adopted.

When the hub bolts are pressed into the wheel-mounting flange, if swelling develops around the holes formed in the wheel-mounting flange, flatness of the brake rotor-mounting surface of the wheel-mounting flange worsens, thus constituting a factor in deformation of the brake rotor. Thus, the fitting interference between the hub bolts, which are formed with a knurled portion on their outer periphery, and the holes in the wheel-mounting flange into which the knurled portions of the hub bolts are pressed, is restricted to within a range of 0.1–0.4 mm to suppress swelling around the holes in the wheel-mounting flange, thereby improving flatness of the brake rotor-mounting surface of the wheel-mounting flange. Further, by forming the portions around the holes of the wheel-mounting flange into which the knurled portions of the hub bolts are pressed, in an unhardened state, it is possible to further suppress swelling around the holes in the wheel-mounting flange.

Further, by inclining the wheel-mounting flange toward the outer side at an angle of 20 minutes or under, the effect of suppressing deformation of the brake rotor can be further increased. Here, the outer side refers to the outer side in the width direction of the vehicle body.

By inclining it as above, when the brake rotor is brought into abutment with the brake rotor-mounting surface of the wheel-mounting flange and the disc wheel of the wheel is superposed on the brake rotor and the wheel nuts are tightened on the hub bolts to clamp the brake rotor and the disc wheel, the wheel-mounting flange is resiliently deformed, so that the outer peripheral portion of the brake rotor-mounting surface strongly abuts the brake rotor. Thus, the brake rotor is supported stably at the outer peripheral portion of its abutment surface relative to the brake rotor-mounting surface, so that it is possible to suppress run-out of the braking surface of the brake rotor during rotation.

If the inclination angle of the wheel-mounting flange is larger than necessary, the amount of resilient deformation of the wheel-mounting flange will be too small to bring the inner peripheral portion of the brake rotor into contact with the brake rotor-mounting surface of the wheel mounting flange when the brake rotor and the disc wheel are clamped by tightening the wheel nuts with a specified torque. In this case, mounting of the brake rotor will not be stable enough to suppress run-out of the braking surfaces of the brake rotor. Thus, the inclination angle of the wheel-mounting flange is preferably 20 minutes or less.

Also, if the run-out of the brake rotor-mounting surface of the wheel-mounting flange exceeds 30 $\mu$m, run-out of the brake rotor during rotation would be so much that brake judder may develop. Thus, the run-out of the brake rotor-mounting surface of the wheel-mounting flange is preferably 30 $\mu$m or under.

If the flatness at the outer peripheral portion and the circumferential flatness of the brake rotor-mounting surface of the wheel-mounting flange are 30 $\mu$m or under, it is possible to suppress the run-out of the braking surfaces of the brake rotor to a small value.

The circumferential flatness refers to a dimension described below. With a measuring device B such as a dial gauge brought into contact with the outer peripheral portion of the brake rotor-mounting surface 15a of the wheel-mounting flange 15 as shown in FIG. 12A, undulating components in a circumferential direction are measured while rotating the wheel-mounting flange and they are developed on a plane and sandwiched by two parallel straight lines as shown in FIG. 12B. The circumferential flatness refers to the minimum distance $\delta$ therebetween.

The wheel bearing assembly according to this invention may be one for a driving wheel or a non-driving wheel. Also, the wheel bearing assembly may be one in which a brake rotor is mounted to the wheel-mounting flange. If the run-out of the braking surfaces of the brake rotor is 50 $\mu$m or less, favorable results are obtained in suppressing brake judder.

Other features and objects of the present invention will become apparent from the following description made with reference to the accompanying drawings, in which:

BRIEF DESCRIPTION OF THE DRAWINGS

FIG. 14A is an enlarged view similar to FIG. 4A for the conventional wheel bearing assembly of FIG. 10; and FIG. 14B is an enlarged view similar to FIG. 4B.

DETAILED DESCRIPTION OF THE PREFERRED EMBODIMENTS

Hereinbelow, the embodiments of this invention will be described with reference to the drawings.

Figure 1:
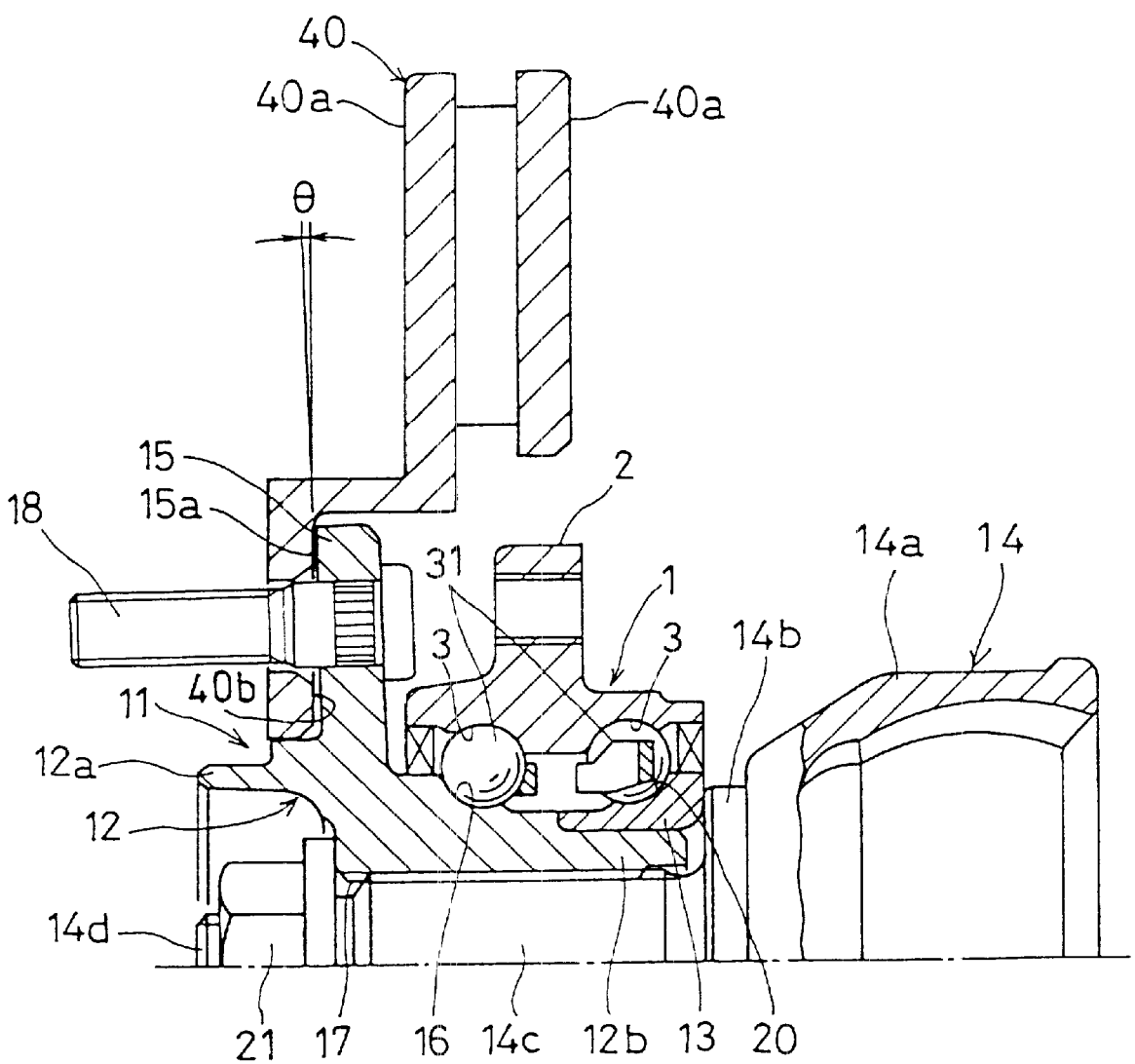
FIG. 1 is a vertical sectional front view of a first embodiment of a wheel bearing assembly according to this invention.

FIG. 1 shows a first embodiment which is a wheel bearing assembly for a driving wheel. This wheel bearing assembly comprises an outer member 1, an inner member 11 and rolling elements 31 mounted between the two members.

The outer member 1 has a mounting flange 2 for mounting to a vehicle body on its outer periphery and is formed with double-row raceways 3 on its inner periphery.

The inner member 11 comprises a hub ring 12, a raceway member 13 and an outer joint member 14 of a constant-velocity joint. A wheel pilot 12a is provided at one end of the hub ring 12, and at the other end, a small-diameter portion 12b is formed. Also on the outer periphery of the hub ring 12, a wheel-mounting flange 15 for mounting a wheel and a single-row raceway 16 are provided. Further, a spline hole 17 is formed in the hub ring 12.

Figure 2:
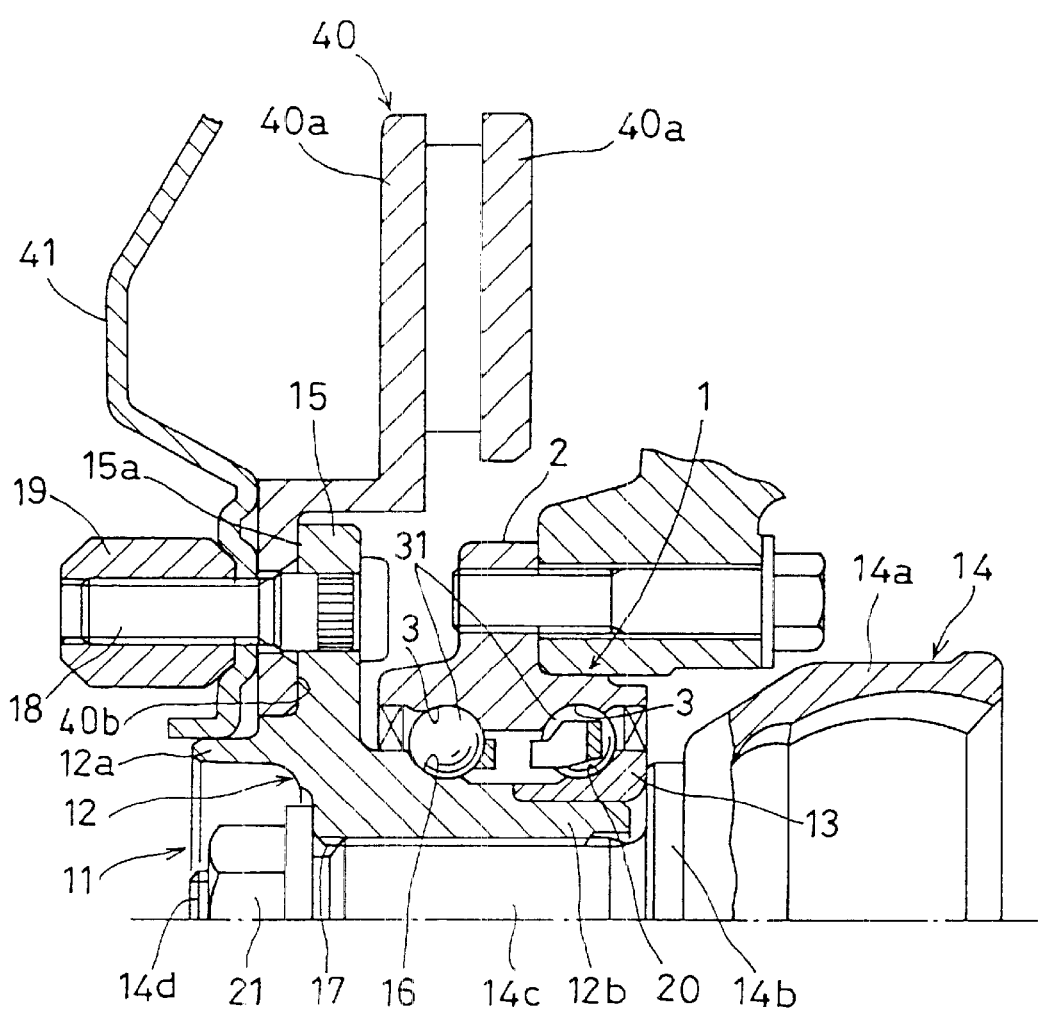
FIG. 2 is a vertical sectional front view showing how a brake rotor and a wheel are mounted on a brake rotor-mounting surface of the same.
Figure 3:
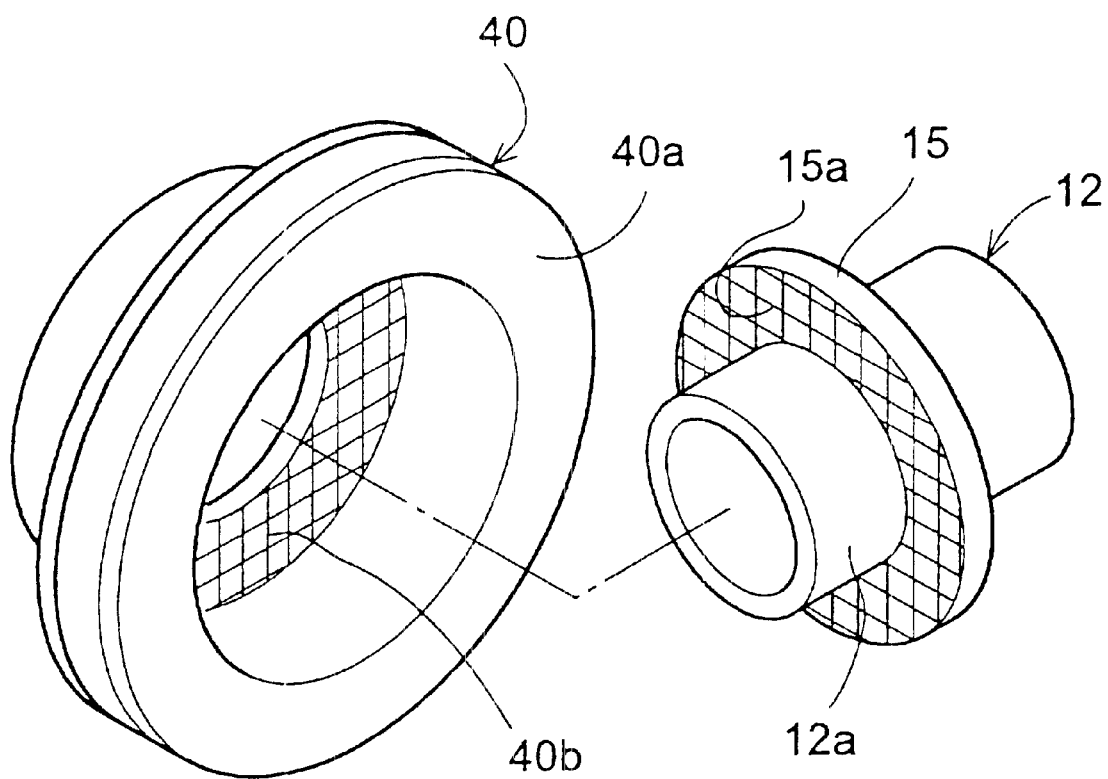
FIG. 3 is a perspective view showing the brake rotor-mounting surface of the wheel bearing assembly and an abutment surface of the brake rotor.
Figure 4A:
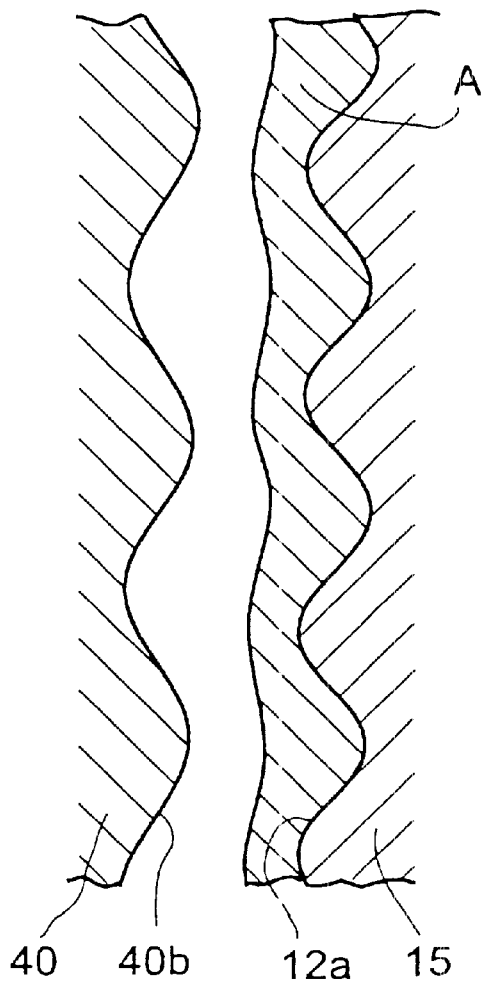
FIG. 4A is an enlarged view showing a state before the brake rotor-mounting surface of the wheel bearing assembly according to this invention and the abutment surface of the brake rotor are tightened together.
Figure 4B:
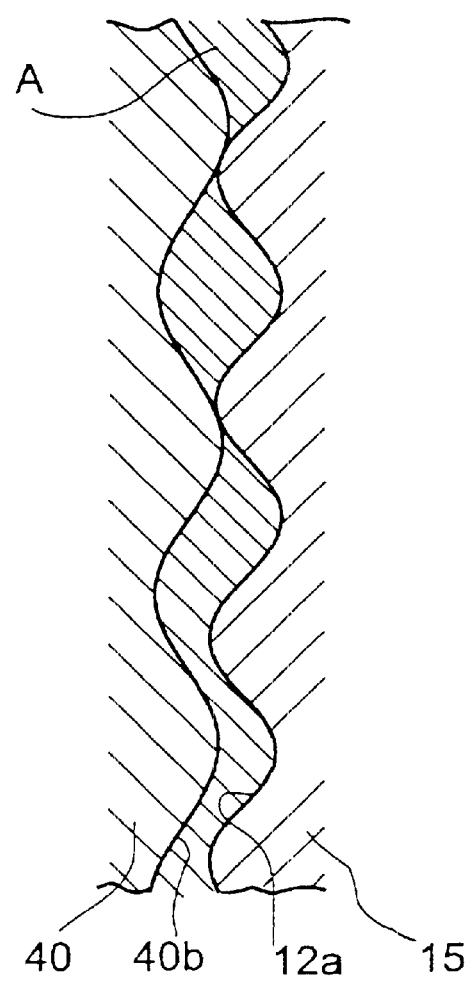
FIG. 4B is an enlarged view showing a state after they have been tightened together.

To the wheel-mounting flange 15, hub bolts 18 are mounted. Wheel nuts 19 are threadedly engaged with the hub bolts 18 as shown in FIG. 2. By tightening the wheel nuts 19, a brake rotor 40 and a disc wheel 41 of the wheel are mounted on a brake rotor-mounting surface 15a formed on the outer side of the wheel-mounting flange 15.

The raceway member 13 is formed with a raceway 20 on the outer periphery. It is fitted on the small-diameter portion 12b, which is formed on the hub ring 12. The rolling elements 31 are mounted between the raceway 20 formed on the outer periphery of the raceway member 13 and one raceway 3 on the outer member 1 and between the other raceway 3 on the outer member 1 and a raceway 16 formed on the outer periphery of the hub ring 12.

The outer joint member 14 of the constant-velocity joint has at a closed end of a cup portion 14a a circular pressing portion 14b which presses the end face of the raceway member 13. At the end face of the pressing portion 14b, a spline shaft 14c is formed. Also, at the tip of the spline shaft 4c, a threaded shaft 14d is provided.

The spline shaft 14c is inserted in the spline hole 17 of the hub ring 12 and by tightening a nut 21 on the threaded shaft 14d at the tip, the outer joint member 14 and the hub ring 12 are clamped, while the hub ring 12 and the raceway member 13 are pressed together axially. By pressing, pre-load is imparted between the rolling elements 31 and the raceways 3, 16 and 20.

In the wheel bearing assembly shown in FIG. 1, between the brake rotor-mounting surface 15a of the wheel-mounting flange 15 and an abutment surface 40b of the brake rotor 40 that abuts the brake rotor-mounting surface 15a, a film is disposed.

The film may be provided on one or both of the brake rotor-mounting surface 15a of the wheel-mounting flange 15 and the abutment surface 40b of the brake rotor 40.

The film is formed of a material softer than steel. For example, it may be formed by bonding or applying a sheet made of an age-hardening resin or a coating of which the major component is an age-hardening resin to the brake rotor-mounting surface 15a of the wheel-mounting flange 15 or the abutment surface 40b of the brake rotor 40.

As the material for the film, by using an age-hardening resin sheet or a coating of which the major component is an age-hardening resin, the mounting rigidity of the brake rotor after mounting a wheel can be ensured. As a specific example of such age-hardening resins, Loctite (trade name) "anaerobic acrylic adhesive" or PCL1B (trade name) "acrylic/enamel-family paint" (Ferrocote paint-trade name) may be used.

The upper limit of the thickness of the film necessary to fill an air gap between the brake rotor-mounting surface 15a of the wheel-mounting flange 15 and the abutment surface 40b of the brake rotor 40 which is one factor in the deformation of the brake rotor 40, is 200 $\mu$m. The lower limit of the thickness of the film is 5 $\mu$m in view of the surface roughness of the brake rotor-mounting surface 15a.

Also, by using a thermosetting resin as the material for the film and providing a simple heating step on the assembly line, it is possible to ensure the mounting rigidity of the brake rotor 40 after mounting a wheel. As such thermosetting resins, Bakelite (trade name for phenolic resin) may be used.

Figure 5:
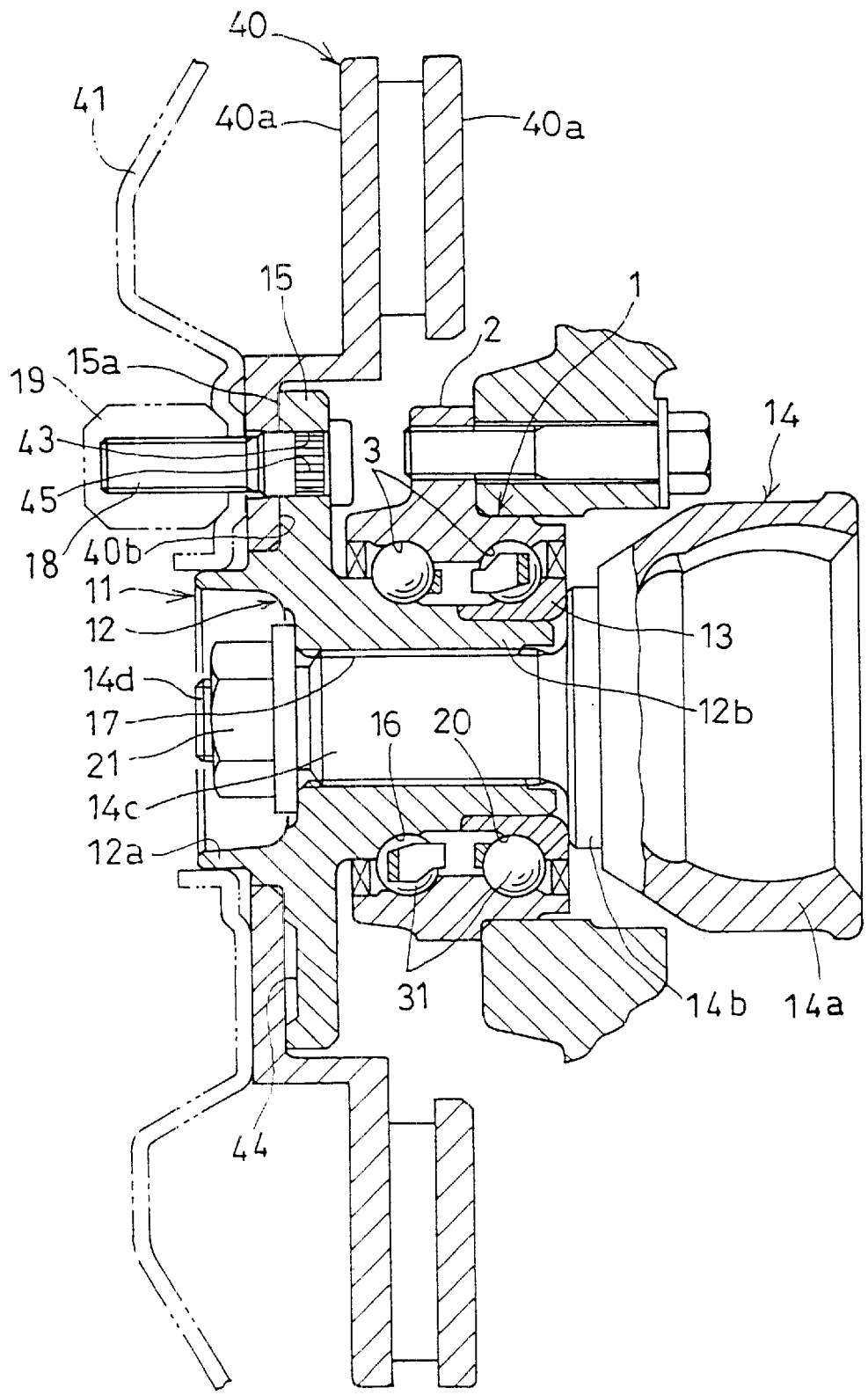
FIG. 5 is a vertical sectional front view of a second embodiment.

FIG. 5 shows a second embodiment which is a wheel bearing assembly for a driving wheel. It comprises an outer member 1, an inner member 11 and rolling elements 31 mounted between the two members.

The second embodiment is basically the same in structure as the first embodiment. Therefore the same numerals are used for the same or similar parts and detailed description is omitted.

In the wheel bearing assembly shown in FIG. 5, by concentrating the contact force between the wheel-mounting flange 15 and the brake rotor 40 when the disc wheel 41 of the wheel is tightened to the hub bolts 18, to portions near the hub bolts 18, the contact will be small on the surfaces between the adjacent hub bolts 18. Thus undulation of the surfaces between the adjacent hub bolts 18 will not become a factor for deformation of the brake rotor 40.

As a means for concentrating the contact force between the wheel-mounting flange 15 and the brake rotor 40 to portions near the hub bolts 18, the following methods may be employed.

Figure 6:
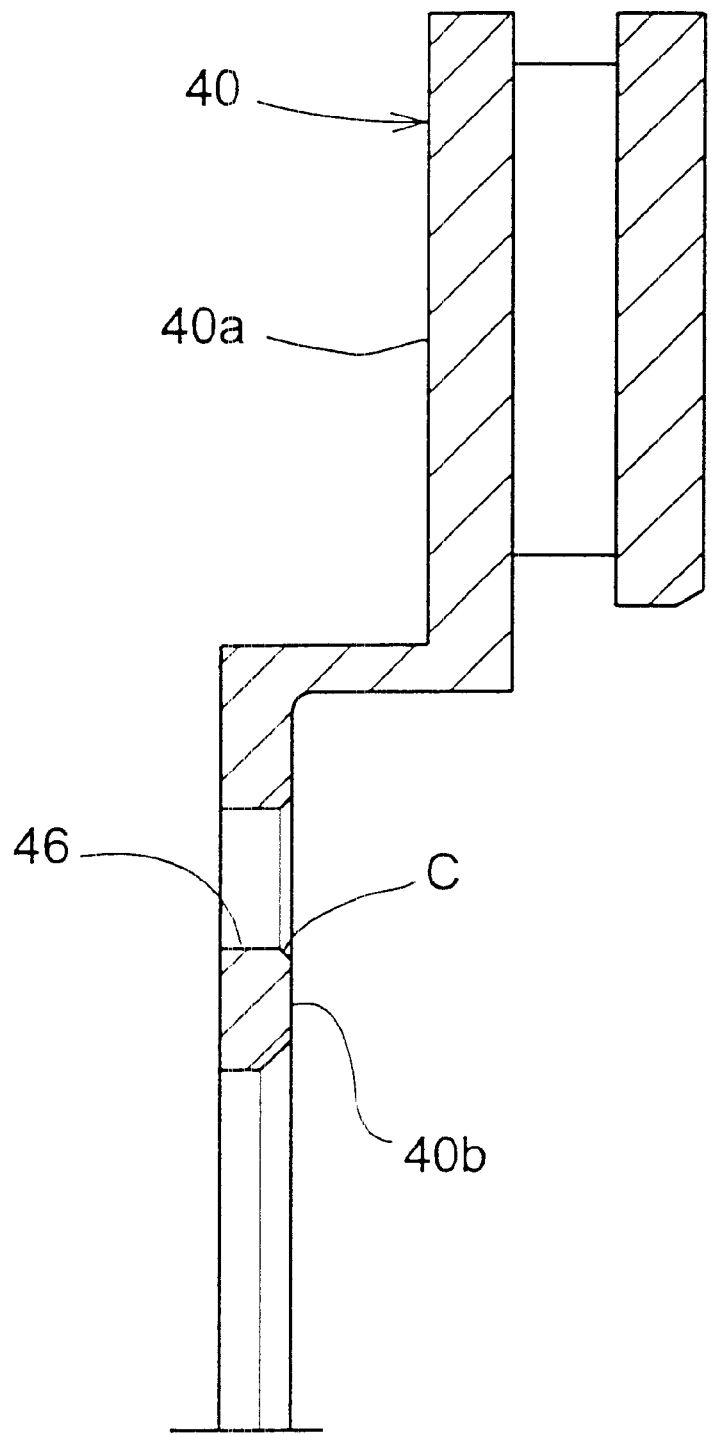
FIG. 6 is a partial vertical sectional front view of the brake rotor of the same.

In one of them, as shown in FIG. 6, a chamfer C at edges of holes 46 for the hub bolts 18 formed in the brake rotor 40 is set to 0.5 mm or less.

By setting the chamfer C of the holes 46 for the hub bolts 18 to as small as 0.5 mm or less, it is possible to concentrate the contact force between the wheel-mounting flange 15 and the brake rotor 40 when the disc wheel 41 is tightened to the hub bolts 18 to portions near the hub bolts 18, so that the contact between the wheel-mounting flange 15 and the brake rotor 40 will be small at portions between the adjacent hub bolts 18.

Figure 7:
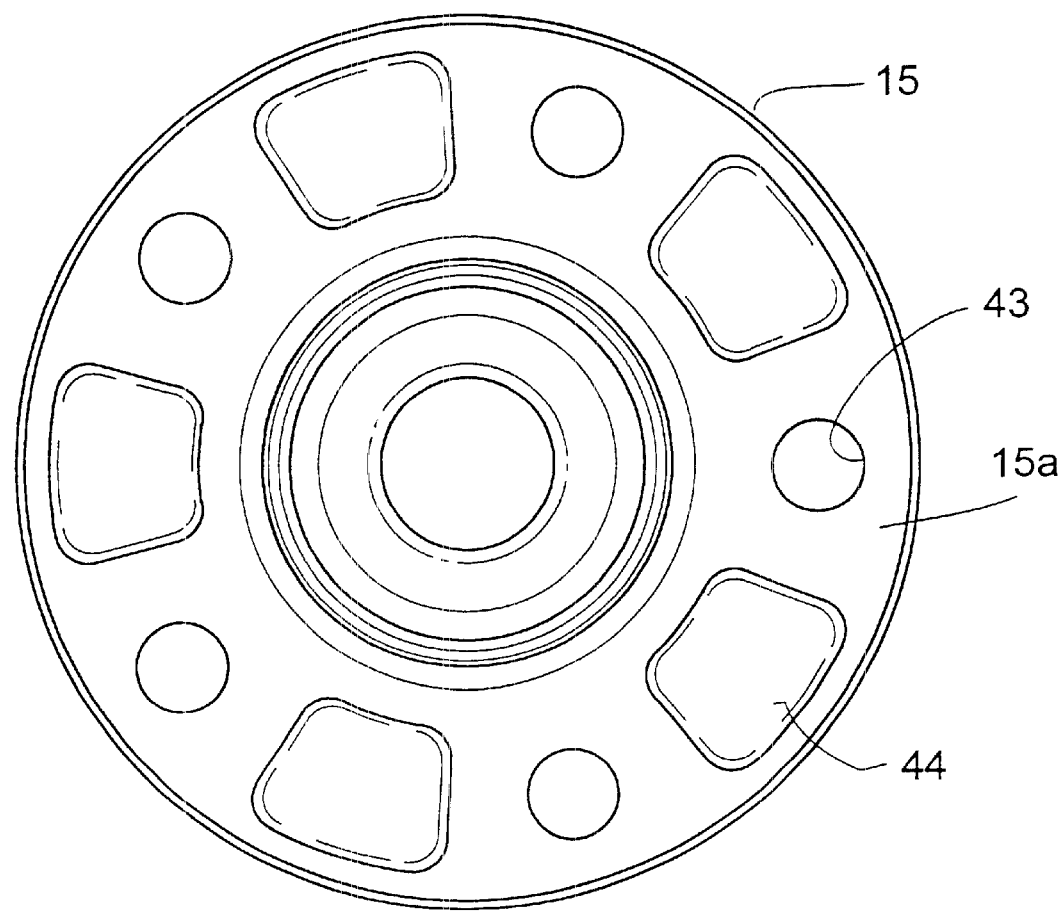
FIG. 7 is a side view of a wheel-mounting flange of the same.

A second method is to form recesses 44, as shown in FIG. 7, between the hub bolts 18 in a bolt pitch circle area on one side of the wheel-mounting flange 15, i.e. between the holes 43 for the hub bolts 18 in the flange 15. By provision of the recesses 44, contact between the wheel-mounting flange 15 and the brake rotor 40 decreases between the adjacent hub bolts 18.

Next, by restricting the fitting interference between the hub bolts 18, which are formed with a knurled portion 45 on their outer peripheries, and the holes 43 of the wheel-mounting flange 15 into which the knurled portions 45 of the hub bolts 18 are pressed, to within a range of 0.1 to 0.4 mm, it is possible to suppress swelling around the holes 43 formed in the wheel-mounting flange 15, which occurs when the hub bolts 18 are pressed into the wheel-mounting flange 15. Thus, the flatness of the brake rotor mounting surface of the wheel-mounting flange 15 improves. If the fitting interference is 0.1 mm or less, the bolt-slip torque and the bolt-pulling resisting force will be insufficient. On the other hand, if it is 0.4 mm or over, swelling will develop around the holes 43 of the wheel-mounting flange 15. Also, in order to effectively suppress swelling around the holes 43 of the wheel-mounting flange 15, the portions around the holes 43 of the wheel-mounting flange 15, into which the knurled portions 45 of the hub bolts 18 are pressed, should preferably be left unhardened.

In the first and second embodiments, the wheel-mounting flange 15 formed on the hub ring 12 is inclined toward the outer side so that the brake rotor-mounting surface 15a has an overall frusto conical shape that is concave toward the outer side. The run-out of the brake rotor-mounting surface 15a of the wheel-mounting flange 15 during rotation is restricted within a standard value, which is 30 μm or under. The outer side refers to the outer side in the width direction of a vehicle body with the wheel bearing assembly mounted on the vehicle body.

By inclining the wheel-mounting flange 15 to the outer side, as shown in FIG. 2, when one side of the brake rotor 40 is brought into abutment with the brake rotor-mounting surface 15a of the wheel-mounting flange 15, the disc wheel 41 of the wheel is brought into abutment with the other side of the brake rotor 40, and the wheel nuts 19 are tightened with a specified torque, the wheel-mounting flange 15 is resiliently deformed, so that the outer peripheral portion of the brake rotor-mounting surface 15a strongly abuts the one side of the brake rotor 40.

This assures that the brake rotor 40 is supported at the outer peripheral portion of the abutment surface facing the brake rotor-mounting surface 15a with good stability. Thus, combined with the fact that the run-out during rotation of the brake rotor-mounting surface 15a is restricted within a standard value of 30 μm or under, and with the rotor deformation-suppressing function of the film disposed between the brake rotor-mounting surface 15a and the abutment surface 40b of the brake rotor 40, it is possible to suppress runout of the braking surfaces 40a of the brake rotor 40 during rotation to a small value and thus to effectively suppress brake judder.

If the inclination angle θ of the wheel-mounting flange 15 is unnecessarily large, when the brake rotor 40 and the disc wheel 41 are fixed by tightening the wheel nuts 19 with a specified torque, the amount of resilient deformation of the wheel-mounting flange 15 will be too small to bring the entire brake rotor-mounting surface 15a of the wheel-mounting flange 15 into tight contact with the one side of the brake rotor 40. This makes mounting of the brake rotor 40 unstable, so that it is impossible to suppress run-out of the braking surfaces 40a of the brake rotor 40 during rotation. Thus, the inclination angle θ of the wheel-mounting flange 15 is preferably 20 minutes or less.

Also, if the flatness at the peripheral portion and the circumferential flatness of the brake rotor-mounting surface 15a of the wheel-mounting flange 15 exceed 30 μm, run-out of the braking surfaces 40a of the brake rotor 40 during rotation grows too much to suppress the development of brake judder. Thus, the flatness at the peripheral portion and the circumferential flatness of the brake rotor-mounting surface 15a of the wheel-mounting flange 15 are preferably not more than 30 μm.

In order to suppress the run-out of the braking surfaces 40a of the brake rotor 40 to a small value, the flatness and circumferential flatness of the abutment surface of the brake rotor 40 facing the wheel-mounting flange 15 are set at not more than 30 μm so that the run-out of the braking surfaces 40a of the brake rotor 40 will be suppressed to 50 μm or under. By controlling the run-out of the brake rotor-mounting surface 15a of the wheel-mounting flange 15, that of the abutment surface of the brake rotor 40 relative to the wheel-mounting flange 15 and that of the braking surfaces 40a of the brake rotor 40, it is possible to substantially completely prevent development of brake judder.

In the first and second embodiments, the nut 21 is tightened on the threaded shaft 14d provided on the outer joint member 14. By tightening the nut 21, the hub ring 12 and the raceway member 13 are pressed together axially to impart pre-load between the rolling elements 31 and the raceways 3, 16 and 20. But by axially extending the small-diameter portion 12b formed on the hub ring 12 and caulking the end protruding beyond the end of the raceway member 13, the hub ring 12 and the raceway member 13 may be made axially unseparable and preload may be imparted between the rolling elements and the raceways.

FIGS. 8–11 show other embodiments of the wheel bearing assembly according to this invention.

Figure 8:
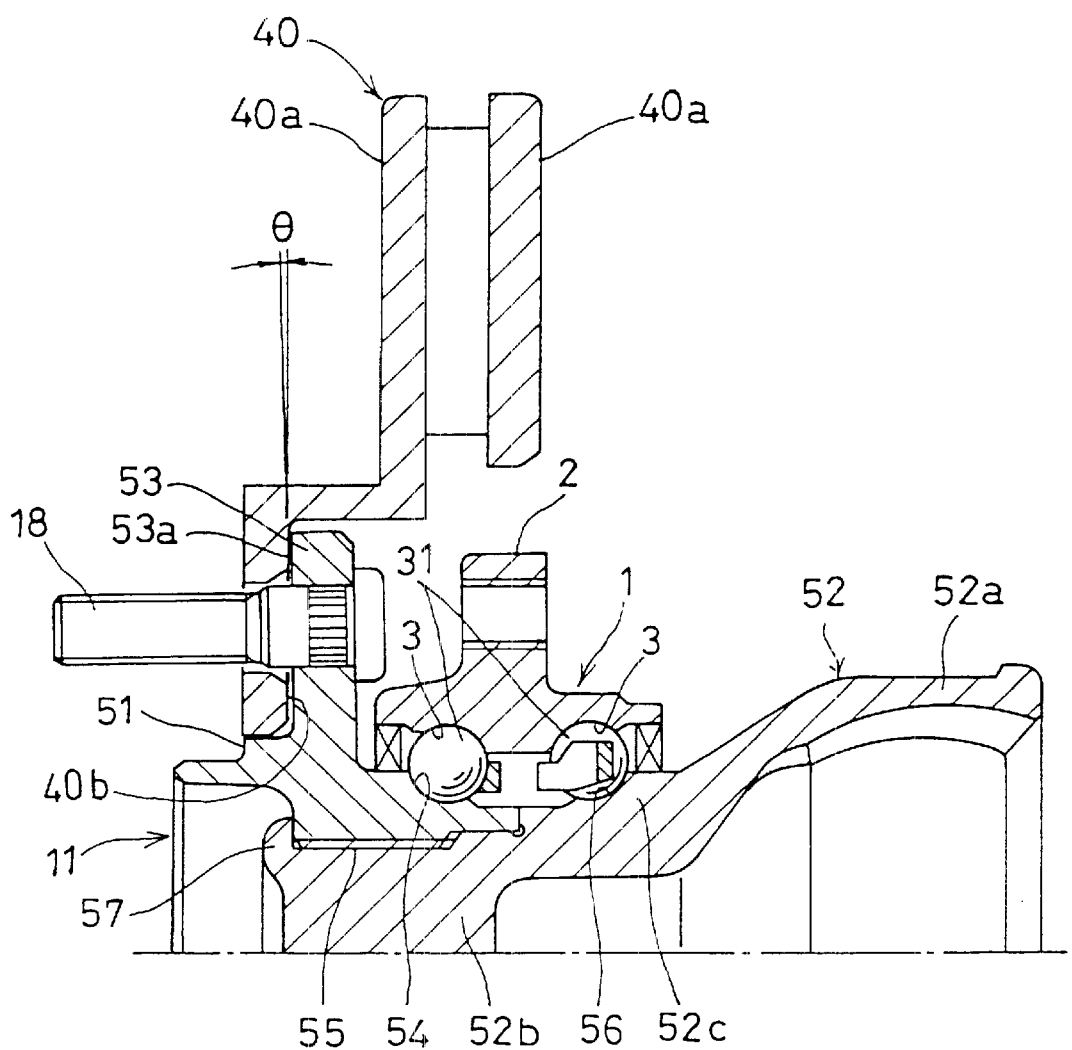
FIG. 8 is a vertical sectional front view of a third embodiment.

FIG. 8 shows a third embodiment which is a wheel bearing assembly for a driving wheel. This wheel bearing assembly differs from the wheel bearing assembly shown in FIG. 1 only in the structure of the inner member. Thus, for the same parts, the same symbols are affixed and description is omitted.

The inner member 11 comprises a hub ring 51 and an outer joint member 52 of a constant-velocity joint. On the outer periphery of the hub ring 51, a wheel-mounting flange 53 and a raceway 54 are formed. In the hub ring 51, a spline hole 55 is formed.

The outer joint member 52 is provided with a spline shaft 52b at a closed end of a mouth portion 52a. On the outer peripheral surface of a shoulder portion 52c of the mouth portion 52a, a raceway 56 is formed. The spline shaft 52b is inserted in the spline hole 55 of the hub ring 51.

Rolling elements 31 are mounted between the raceway 54 formed on the hub ring 51 and one raceway 3 on the outer member 1 and between the raceway 56 formed on the outer joint member 52 and the other raceway 3 on the outer member 1. Pre-load is imparted between the rolling elements 31 and the raceways 3, 54 and 56 by caulking the end of the spline shaft 52b. Also, by caulking, the hub ring 51 and the outer joint member 52 are made axially inseparable. 57 shows the caulked portion.

In this embodiment, too, a film is disposed between the brake rotor-mounting surface 53a of the wheel-mounting flange 53 and the abutment surface 40b of the brake rotor 40. Also, the wheel-mounting flange 53 formed on the hub ring 51 is inclined toward the outer side, and the inclination angle θ is 20 minutes or less. The run-out of the brake rotor-mounting surface 53a of the wheel-mounting flange 53 is restricted within a standard value of 30 μm or under. Flatness at the outer peripheral portion and the circumferential flatness are restricted to 30 μm or under. The brake rotor 40 to be mounted on the wheel-mounting flange 53 has an abutment surface having a flatness and a circumferential flatness of preferably 30 μm or under. The run-out range of the braking surfaces of the brake rotor 40 is within a standard value of 50 μm or under.

Figure 9:
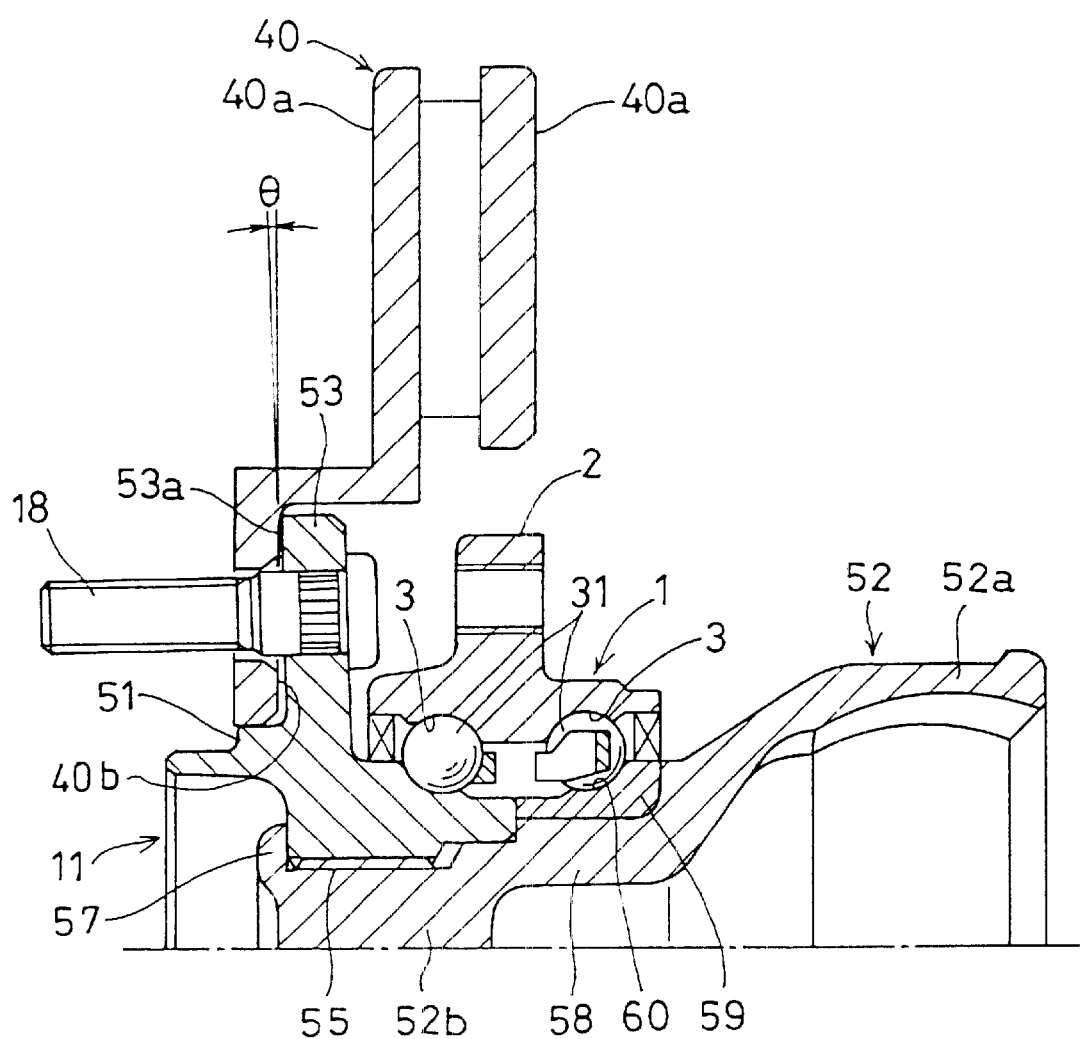
FIG. 9 is a vertical sectional front view of a fourth embodiment.

FIG. 9 shows a fourth embodiment which is a wheel bearing assembly for a driving wheel. This embodiment differs from the wheel bearing assembly shown in FIG. 8 in that at the root of a spline shaft 52b of an outer joint member 52 of a constant-velocity joint, a bearing portion 58 having a larger diameter than the spline shaft 52b is formed, and a raceway 60 is formed on the outer periphery of a raceway member 59 pressed onto the bearing portion 58. It is the same in that the wheel-mounting flange 53 formed on the hub ring 51 is inclined toward the outer side at an angle of 20 minutes or under, the run-out of the brake rotor-mounting surface 53a of the wheel-mounting flange 53 is restricted within a standard value of 30 μm or under, and the flatness and circumferential flatness are restricted to 30 μm or under.

In this embodiment, too, the flatness and circumferential flatness of the abutment surface of the brake rotor 40 to be mounted on the wheel-mounting flange 53 is restricted to 30 μm or under, and the run-out range of the braking surfaces of the brake rotor 40 is restricted within a standard value of 50 μm or under.

Figure 10:
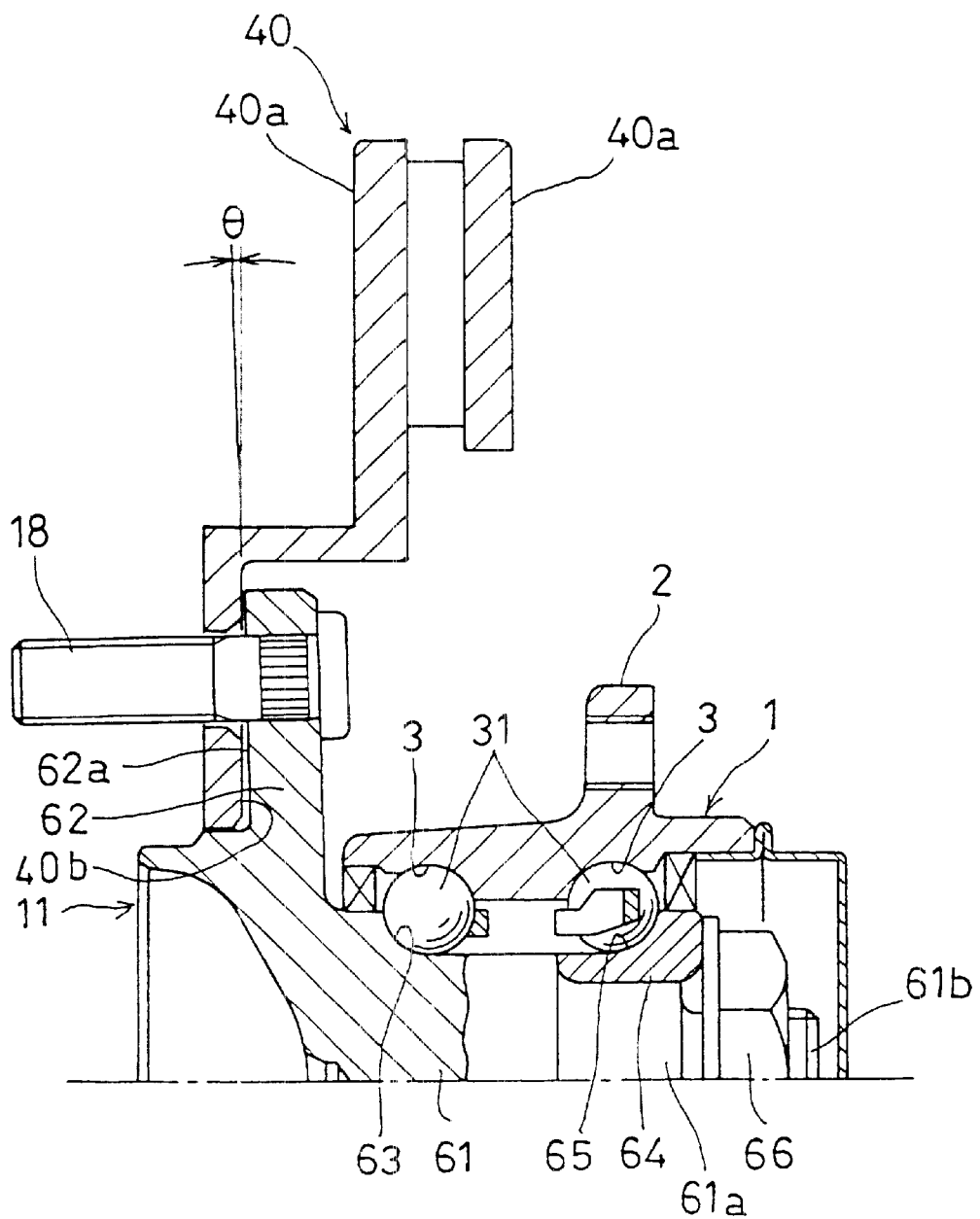
FIG. 10 is a vertical sectional front view of a fifth embodiment.

FIG. 10 shows a fifth embodiment which is a wheel bearing assembly for a non-driving wheel. This wheel bearing assembly differs from the wheel bearing assembly shown in FIG. 1 only in the inner members 11. The inner member 11 comprises an axle 61 having a wheel-mounting flange 62 and a single-row raceway 63 on its outer periphery, and a raceway member 64 having a single-row raceway 65 on its outer periphery.

At the end of the axle 61, a small-diameter shaft portion 61a is formed, and the raceway member 64 is pressed onto the small-diameter shaft portion 61a. Also, at the tip of the small-diameter portion 61a, a threaded shaft 61b is formed, and by tightening a nut 66 on the threaded shaft 61b, the axle 61 and the raceway member 64 are clamped together in an assembled state, while preload is imparted between the rolling elements 31 and the raceways 3, 63 and 65.

In the fifth embodiment, too, a film is disposed between the brake rotor-mounting surface 62a of the wheel-mounting flange 62 and the abutment surface 40b of the brake rotor 40 that abuts the brake rotor-mounting surface 62a. Also, the wheel-mounting flange 62 formed on the axle 61 is inclined toward the outer side so that the inclination angle θ is 20 minutes or less. The run-out of the brake rotor-mounting surface 62a of the wheel-mounting flange 62 is restricted within a standard value of 30 μm or under. Flatness and circumferential flatness at the outer peripheral portion are 30 μm or under. The abutment surface of the brake rotor 40 mounted on the wheel-mounting flange 62 relative to the wheel-mounting flange 62 has a flatness and circumferential flatness of 30 μm or under. Further, in a mounted state in which the brake rotor 40 and the disc wheel (not shown) are tightened to the wheel-mounting flange 62, the run-out range of the braking surfaces 40a of the brake rotor 40 is restricted to 50 μm or under.

In the fifth embodiment of FIG. 10, by threadedly engaging the nut 66 with the threaded shaft 61b provided at the tip of the small-diameter shaft portion 61a of the axle 61 and tightening the nut 66, the axle 61 and the raceway member 64 are biassed axially to impart pre-load between the rolling elements 31 and the raceways 3, 63 and 65. But by axially extending the small-diameter shaft portion 61a of the axle 61 and caulking its end protruding outwardly from the end face of the raceway member 64, pre-load may be imparted between the rolling elements 31 and the raceways.

Figure 11:
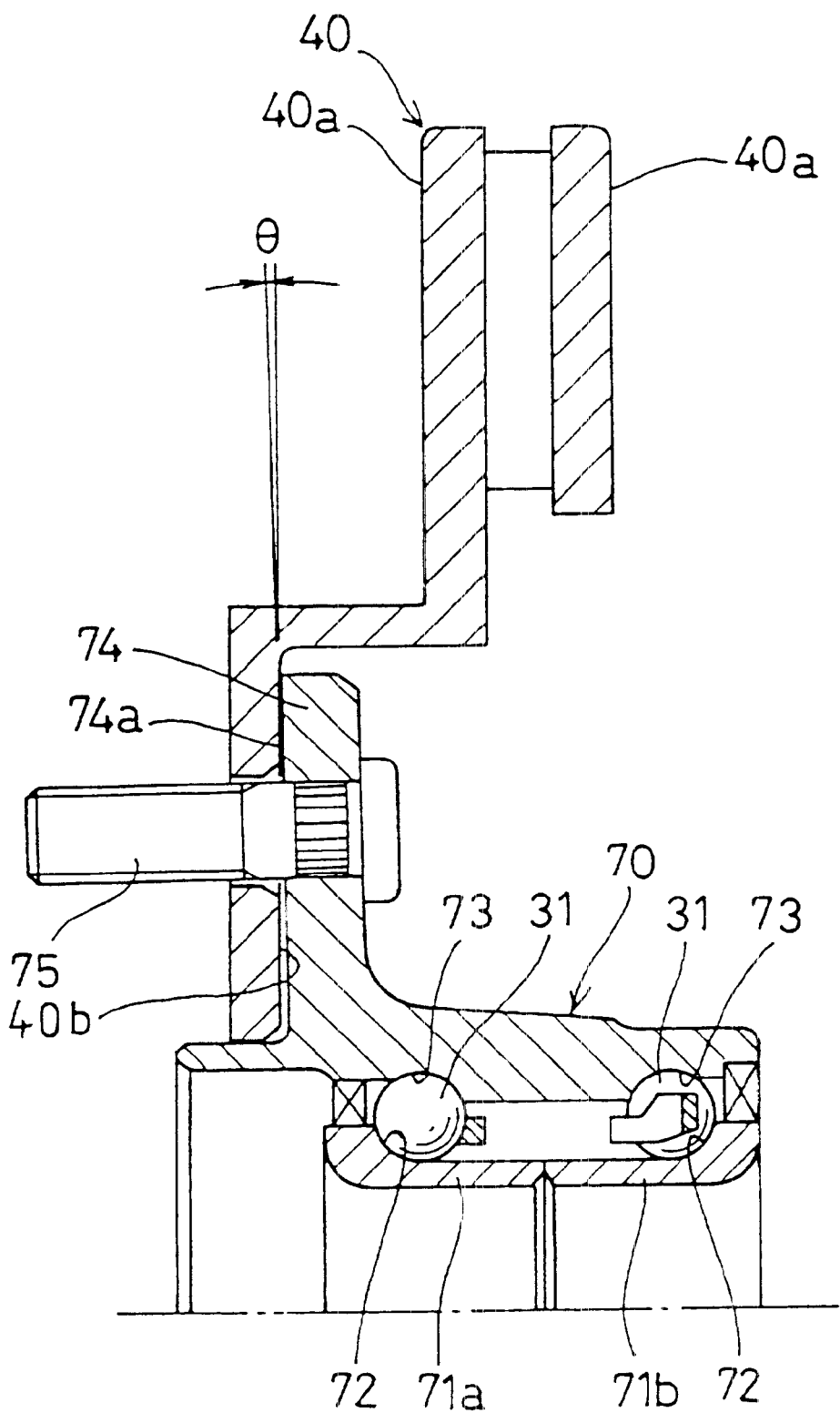
FIG. 11 is a vertical sectional front view of a sixth embodiment.
Figure 12A:
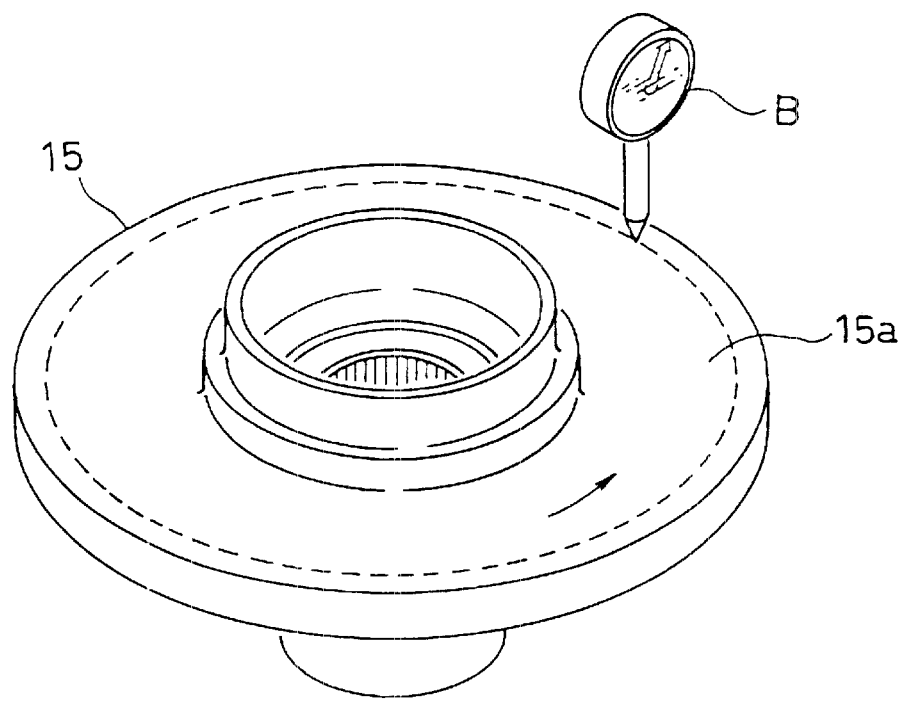
FIG. 12A is a perspective view showing how the circumferential flatness of the wheel-mounting flange is measured.
Figure 12B:
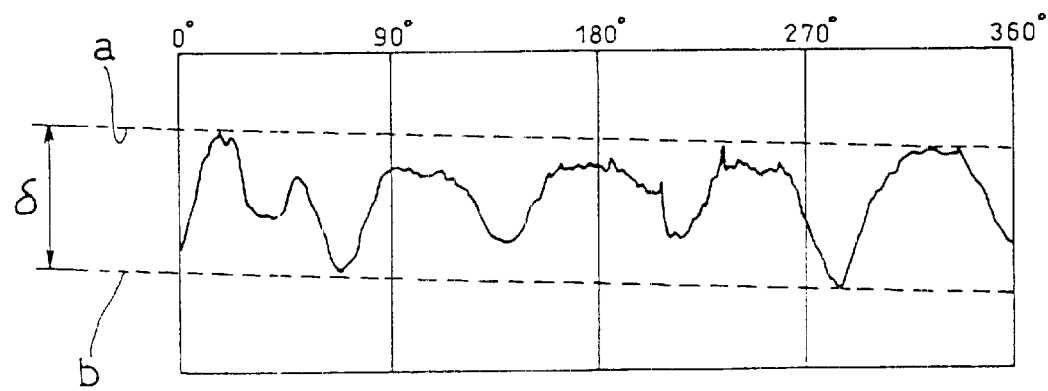
FIG. 12B is an explanatory view showing how the circumferential flatness is determined from the measurement results.
Figure 13:
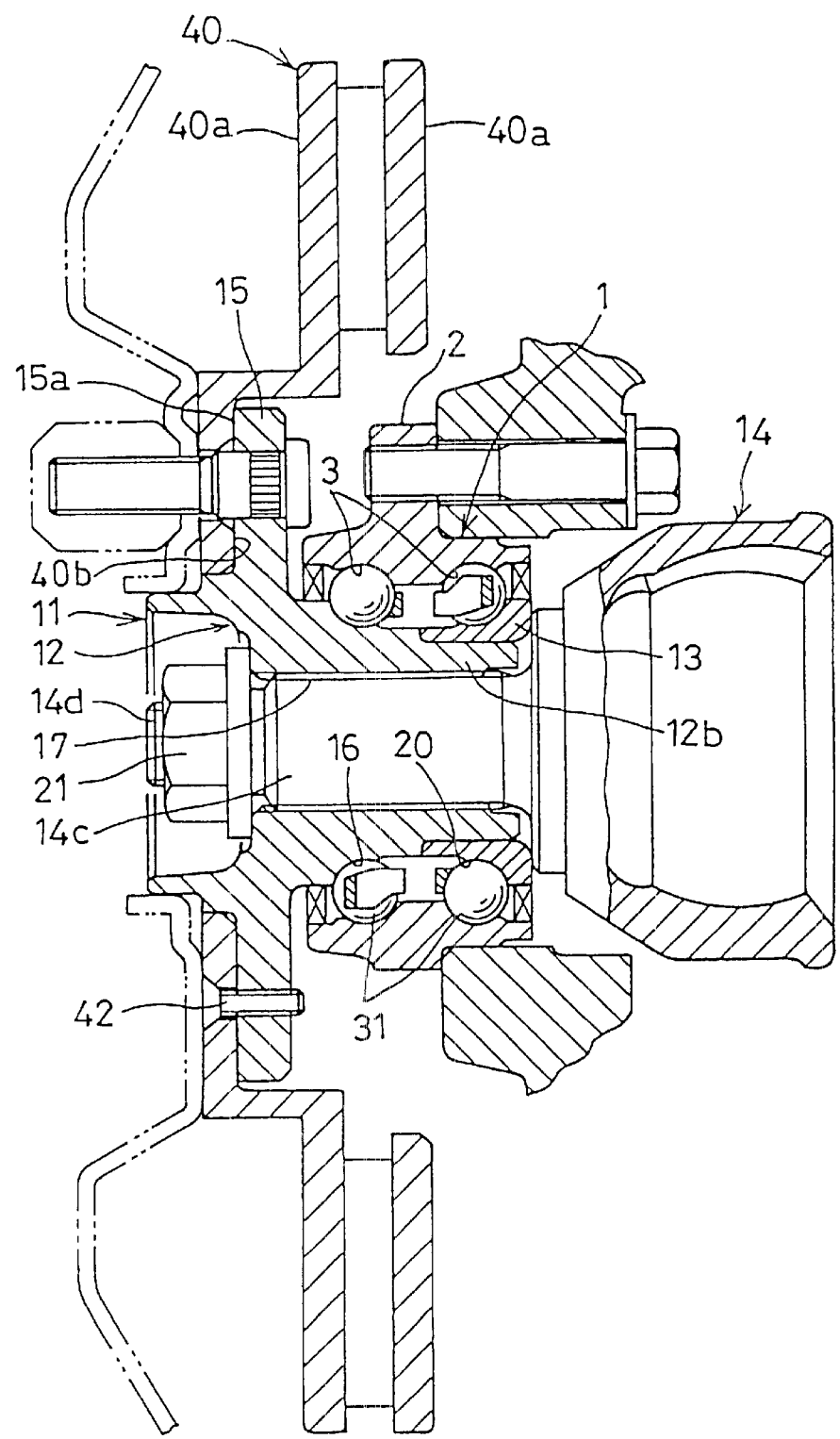
FIG. 13 is a vertical sectional front view showing a conventional wheel bearing assembly.

FIG. 11 shows a sixth embodiment which is a wheel bearing assembly for a non-driving wheel. This wheel bearing assembly has a pair of raceway members 71a, 71b mounted on an axle mounted inside an outer member 70, and has rolling elements 31 mounted between raceways 72 formed on the outer peripheries of the raceway members 71a, 71b and double-row raceways 73 formed on the inner periphery of the outer member 70 to rotatably support the outer member 70.

On the outer periphery of the outer member 70, a wheel-mounting flange 74 is formed, and on the wheel-mounting flange 74, hub bolts 75 for mounting a brake rotor 40 and a wheel are provided.

In the sixth embodiment, too, a film is disposed between the brake rotor-mounting surface 74a of the wheel-mounting flange 74 and the abutment surface 40b of the brake rotor 40 that abuts the brake rotor-mounting surface 74a. Also, the wheel-mounting flange 74 is inclined toward the outer side so that the inclination angle θ is 20 minutes or less. The run-out of the brake rotor-mounting surface 74a of the wheel-mounting flange 74 is restricted within a standard value of 30 μm or under. Flatness and circumferential flatness at the outer peripheral portion are 30 μm or under. The abutment surface of the brake rotor 40 mounted on the wheel-mounting flange 74 relative to the wheel-mounting flange 74 has also a flatness and circumferential flatness of 30 μm or under. Further, in a mounted state in which the brake rotor 40 and a disc wheel (not shown) are tightened to the wheel-mounting flange 74, the run-out range of the braking surfaces 40a of the brake rotor 40 is restricted to 50 μm or under.

In the third to sixth embodiments, by concentrating the contact force between the wheel-mounting flange 15 and the brake rotor 40 when the disc wheel 41 of the wheel is tightened to the hub bolts 18, to portions near the hub bolts, the contact on the surfaces between the adjacent hub bolts 18 may be suppressed so that the undulation of the surfaces between the adjacent hub bolts will not become a factor for deformation of the brake rotor.

As described above, in the wheel bearing assembly according to this invention, by providing a film between the brake rotor-mounting surface of the wheel-mounting flange and the abutment surface of the brake rotor, air gaps, which can be a factor in deformation of the brake rotor when a wheel is mounted, are filled, and deformation of the brake rotor is suppressed. Thus it is possible to easily and inexpensively prevent brake judder.

Also, by concentrating the contact force between the wheel-mounting flange and the brake rotor when the disc wheel of the wheel is tightened to the hub bolts, to portions near the hub bolts, the contact on the surfaces between the adjacent hub bolts is suppressed so that the undulation of the surfaces between the adjacent hub bolts will not become a factor for deformation of the brake rotor. Thus it is possible to prevent brake judder in an easy and inexpensive manner.

What is claimed is:

1. A wheel bearing assembly comprising:
    an outer member having a pair of outer raceways at an inner periphery thereof;
    an inner member having a pair of inner raceways at an outer periphery thereof disposed opposite said outer raceways; and
    rolling elements mounted between said inner and outer raceways;

wherein one of said outer member and said inner member includes a wheel-mounting flange, said wheel-mounting flange having an outer face facing in a generally axially outward direction and constituting a circumferentially-extending brake rotor-mounting surface;

wherein a film is disposed on said brake rotor-mounting surface of said wheel-mounting flange so as to be disposed between said brake-rotor mounting surface and an abutment surface of a brake rotor when the brake rotor is mounted to abut said brake rotor-mounting surface; and wherein said circumferentially-extending brake rotor-mounting surface is inclined relative to a radial direction so as to have an overall frusto conical shape that is concave in the axially outward direction, an incline of said brake rotor-mounting surface being 20 minutes or under.

2. A wheel bearing assembly as claimed in claim 1, wherein the run-out of the outer side face of said wheel-mounting flange during rotation is restricted within a standard value.

3. A wheel bearing assembly as claimed in claim 2, wherein said standard value is 30 $\mu$m or under.

4. A wheel bearing assembly as claimed in claim 1, wherein an outer peripheral portion of said brake rotor-mounting surface of said wheel-mounting flange has a flatness of 30 $\mu$m or under.

5. A wheel bearing assembly as claimed in claim 1, wherein an outer peripheral portion of said brake rotor-mounting surface of said wheel-mounting flange has a circumferential flatness of 30 $\mu$m or under.

6. A wheel bearing assembly as claimed in claim 1, wherein said wheel-mounting flange is provided on said inner member.

7. A wheel bearing assembly as claimed in claim 1, wherein said inner member comprises a hub ring formed with said wheel-mounting flange and one of said inner raceways on the outer periphery thereof and having a small-diameter portion at one end thereof, and an inner ring pressed onto said small-diameter portion of said hub ring and formed with the other of said inner raceways on an outer periphery thereof.

8. A wheel bearing assembly as claimed in claim 1, wherein said inner member comprises a hub ring formed with said wheel-mounting flange and one of said inner raceways on the outer periphery thereof, and an outer joint member of a constant-velocity joint formed with the other of said inner raceways on an outer periphery of a shoulder portion thereof, said outer joint member being provided with a spline, said hub ring being engaged with said spline to transmit a torque.

9. A wheel bearing assembly as claimed in claim 1, wherein said film is softer than steel and has a thickness of 5 to 200 $\mu$m.

10. A wheel bearing assembly as claimed in claim 1, wherein said film comprises a resin sheet made of an age-hardening material.

11. A wheel bearing assembly as claimed in claim 1, wherein said film comprises an acryl/enamel-family paint.

12. A wheel bearing assembly as claimed in claim 1, wherein said film comprises an anaerobic acryl-family adhesive.

* * * * *